(12) United States Patent
Bae et al.

(10) Patent No.: US 8,441,945 B2
(45) Date of Patent: May 14, 2013

(54) SYSTEM AND METHOD FOR PROVIDING MULTIMEDIA CONTENTS IN A COMMUNICATION SYSTEM

(75) Inventors: Su-Jin Bae, Suwon-si (KR); Young-Ky Kim, Seoul (KR); Young-Ki Jeon, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 1896 days.

(21) Appl. No.: 11/598,904

(22) Filed: Nov. 14, 2006

(65) Prior Publication Data

US 2007/0127685 A1 Jun. 7, 2007

(30) Foreign Application Priority Data

Nov. 14, 2005 (KR) .................. 10-2005-0108820

(51) Int. Cl.
*H04L 12/56* (2006.01)
*H04J 1/16* (2006.01)

(52) U.S. Cl.
USPC ............ 370/252; 370/386; 370/490; 709/203

(58) Field of Classification Search ............ 379/207.16, 379/251, 257, 82, 88.13, 201.01, 373.01, 379/373.02; 370/252, 386, 490; 709/203
See application file for complete search history.

(56) References Cited

U.S. PATENT DOCUMENTS

| | | | |
|---|---|---|---|
| 6,731,625 B1 * | 5/2004 | Eastep et al. .................. | 370/352 |
| 7,995,728 B1 * | 8/2011 | Martin et al. ............ | 379/201.02 |
| 2004/0067751 A1 | 4/2004 | Vandermeijden et al. | |
| 2004/0120494 A1 | 6/2004 | Jiang et al. | |
| 2004/0202300 A1 | 10/2004 | Cooper et al. | |
| 2006/0023862 A1 * | 2/2006 | Sutcliffe ....................... | 379/257 |
| 2006/0073795 A1 * | 4/2006 | Mayblum et al. ............ | 455/90.2 |
| 2006/0285675 A1 * | 12/2006 | Radziewicz et al. ..... | 379/215.01 |
| 2007/0019595 A1 * | 1/2007 | Huh et al. ..................... | 370/338 |
| 2007/0026852 A1 * | 2/2007 | Logan et al. ............... | 455/422.1 |
| 2007/0190983 A1 * | 8/2007 | Goldfarb et al. ........... | 455/414.1 |

FOREIGN PATENT DOCUMENTS

| | | |
|---|---|---|
| EP | 1 263 204 | 12/2002 |
| EP | 1 337 095 | 8/2003 |
| EP | 1 592 216 | 11/2005 |
| JP | 2002-064658 | 2/2002 |
| JP | 2005-101927 | 4/2005 |
| WO | WO 2004/093422 | 10/2004 |

* cited by examiner

*Primary Examiner* — John Pezzlo
(74) *Attorney, Agent, or Firm* — The Farrell Law Firm, P.C.

(57) ABSTRACT

A method is provided for providing a multimedia content type ring-back by an origination terminal in a communication system. The method includes providing a multimedia content type ring-back including menu keys mapped to services; and providing a service mapped to a particular menu key, upon receipt of the particular menu key while providing the multimedia content type ring-back. Further, a method is provided for providing a multimedia content type bell by a destination terminal in a communication system. The method includes providing a multimedia content type bell including menu keys mapped to services; and providing a service mapped to a particular menu key, upon receipt of the particular menu key while providing the multimedia content type bell.

33 Claims, 12 Drawing Sheets

SYSTEM AND METHOD FOR PROVIDING MULTIMEDIA CONTENTS IN A COMMUNICATION SYSTEM

PRIORITY

This application claims the benefit under 35 U.S.C. §119(a) of an application filed in the Korean Intellectual. Property Office on Nov. 14, 2005 and assigned Serial No. 2005-108820, the entire contents of which are hereby incorporated by reference.

BACKGROUND OF THE INVENTION

1. Field of the Invention

The present invention relates generally to a system and method for providing contents in a communication system, and in particular, to a system and method for providing multimedia contents.

2. Description of the Related Art

Internet Protocol (IP) Multimedia Subsystem (IMS), a system that provides IP-based packet communication service, is a system based on the Session Initiation Protocol (SIP), which is a text-based application layer control protocol. The SIP is based on a client/server configuration where if clients start calling, a server responds thereto, and enables more than one attendant to generate, update and close a session. The session is performed in teleconferencing, telephony, interview, event notification and Instant Messaging (IM), all of which are based on the Internet. Because the SIP is based on general text-based Internet standards, it is easy to troubleshoot and network debug.

A description will now be made of an alerting method in the SIP-based multimedia telephony environment. The term "alerting" as used herein refers to a ring-back and bell or bell sound. In the SIP-based multimedia telephony environment, a 180-Ringing message is used to provide a ring-back to an origination terminal (or calling terminal). Upon receipt of the 180-Ringing message, the origination terminal reproduces a local ring-back or reproduces ring-back data included in the Ringing message to thereby provide a ring-back to its user.

Further, in the SIP-based multimedia telephony environment, an INVITE message is used to provide a bell to a destination terminal (or called terminal). Upon receipt of the INVITE message, the destination terminal reproduces a previously stored bell or reproduces bell data included in the INVITE message to thereby provide the bell to its user.

A description will now be made of alerting methods provided by the proposed communication systems, such as the Public Switched Telephone Network (PSTN), the Code Division Multiple Access (CDMA) communication system, and the Wideband Code Division Multiple Access (W-CDMA) communication system.

An origination terminal's user, while sending an outgoing call, is provided with only the default ring-back preset in the corresponding communication system or the ring-back preset in the origination terminal or the destination terminal, and a destination terminal's user, while receiving an incoming call, is provided with only the ring (or bell) preset in the destination terminal. The default ring-back, the ring-back preset in the origination terminal and the destination terminal, and the ring preset in the destination terminal are all a simple audio signal.

As described above, the proposed communication systems provide the alerting, i.e. ring-back and bell, regardless of the needs and tastes of the origination terminal's user and the destination terminal's user, because there are limitations on the terminal capabilities and the resources provided for the ring-back and the bell. Along with the development of the communication system, the terminal capabilities also improve. There is a need for an improved alerting method capable of providing alerts according to the needs and tastes of the terminal users, instead of providing the simple audio signal unilaterally provided from the communication system.

SUMMARY OF THE INVENTION

It is, therefore, an object of the present invention to provide a system and method for providing multimedia contents in a communication system.

It is another object of the present invention to provide a system and method for providing multimedia content type alerting in a communication system.

It is further another object of the present invention to provide a system and method for providing a multimedia content type ring-back to an origination terminal in a communication system.

It is yet another object of the present invention to provide a system and method for providing a multimedia content type bell to a destination terminal in a communication system.

It is still another object of the present invention to provide a system and method for additionally providing a separate service while an origination terminal provides a multimedia content type ring-back in a communication system.

It is still another object of the present invention to provide a system and method for additionally providing a separate service while a destination terminal provides a multimedia content type bell in a communication system.

According to one aspect of the present invention, there is provided a method for providing a multimedia content type ring-back by an origination terminal in a communication system. The method includes providing a multimedia content type ring-back including menu keys mapped to possible services; and upon receipt of the particular menu key while providing the multimedia content type ring-back providing a service mapped to a particular menu key.

According to another aspect of the present invention, there is provided a method for providing a multimedia content type bell by a destination terminal in a communication system. The method includes providing a multimedia content type bell including menu keys mapped to possible services; and upon receipt of the particular menu key while providing the multimedia content type bell providing a service mapped to a particular menu key.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention proposes a system and method for providing multimedia contents in an Internet Protocol (IP)-based communication system. The present invention also provides a system—and method for providing multimedia content type alerting in an IP-based communication system. The term "alerting" as used herein refers to a ring-back provided to an origination terminal during call originated from the origination terminal, and a bell provided to a destination terminal during call reception at the destination terminal.

Figure 1:
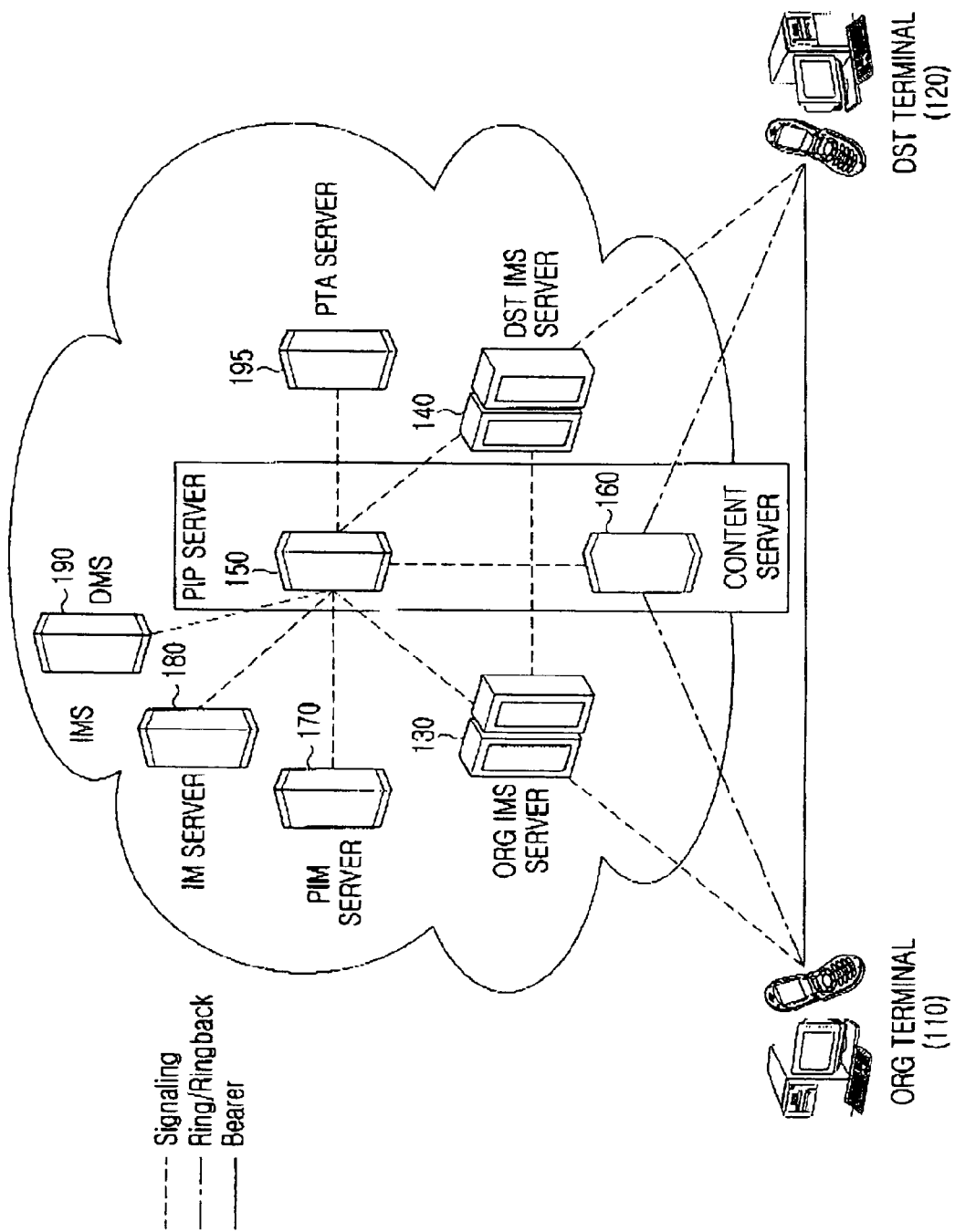
FIG. 1 is a diagram illustrating a configuration of a communication system that provides multimedia content type alerting according to the present invention.

FIG. 1 is a diagram illustrating a configuration of a communication system that provides multimedia content type alerting according to the present invention.

Referring to FIG. 1, an origination (ORG) terminal 110 and a destination (DST) terminal 120 both support a multimedia function, and provide multimedia content type alerting. Because the origination terminal 110 can provide a multimedia content type ring-back and the destination terminal 120 can provide a multimedia content type bell, both the origination terminal 110 and the destination terminal 120 should support the multimedia function. The origination terminal 110 is connected to an origination IP Multimedia Subsystem (IMS) server 130 and a content server 160, and the destination terminal 120 is connected to a destination IMS server 140 and the content server 160.

The origination IMS server 130, the destination IMS server 140 and the content server 160 are each connected to a Personal IMS Portal application (PIP) server 150. The PIP server 150 is connected to a Presence Information Management (PIM) server 170, an Instant Messaging (IM) server 180, a Data Manipulation Server (DMS) 190, and a Push-To-All (PTA) server 195. Although it is shown in FIG. 1 that the PIP server 150 is connected to the Presence Information Management server 170, the IM server 180, the DMS 190, and the PTA server 195 by way of example, the PIP server 150 can also be connected to various application severs supporting various functions corresponding to the multimedia content type alerting that the communication system is configured to provide.

The origination terminal 110 and the destination terminal 120 have no limitation on their communication methods, i.e. can perform any one of a wire communication method, a wireless communication method, and a combined wire and wireless communication method, and should have the processing power sufficient to reproduce the multimedia content type alerting. In addition, because the origination terminal 110 and the destination terminal 120 should be able to reproduce the multimedia content type alerting, they should have a voice/multimedia recording and reproducing function and should support a method of transmitting/receiving specific multimedia data using a header and a body of a Session Initiate Protocol (SIP) message.

The origination IMS server 130 and the destination IMS server 140 control call setup and call release operations of the origination terminal 110 and the destination terminal 120, and provide multimedia content type alerting to the origination terminal 110 and the destination terminal 120 in cooperation with the PIP server 150 at the time where they should provide the multimedia content type alerting to the origination terminal 110 and the destination terminal 120 according to service profiles of the origination terminal 110 and the destination terminal 120.

The PIP server 150 performs a control operation of providing the multimedia content type alerting to the origination terminal 110 and the destination terminal 120. The PIP server 150 provides multimedia contents in order to provide the multimedia content type alerting to the origination terminal 110 and the destination terminal 120 in response to requests of the origination IMS server 130 and the destination IMS server 140.

The content server 160 maintains/manages the multimedia contents that can be realized with Hyper Text Transfer Protocol (HTTP), Wireless Application Protocol (WAP), and flash animation, in addition to the audio, video, image and message. The content server 160 may be realized in the PIP server 150.

The Presence Information Management server 170 maintains/manages presence information of the origination terminal 110 and the destination terminal 120, and provides the presence information of the origination terminal 116 and the destination terminal 120 to the PIP server 150 at the request of the PIP server 150.

The IM server 180 manages transmission/reception of instant messages. The DMS 190 stores a service profile of each group and access information of each group for each of the terminals, and also stores service priority information. The PTA server 195 provides a PTA service supporting unidirectional transmission of voice, multimedia and data between terminals.

Figure 2:
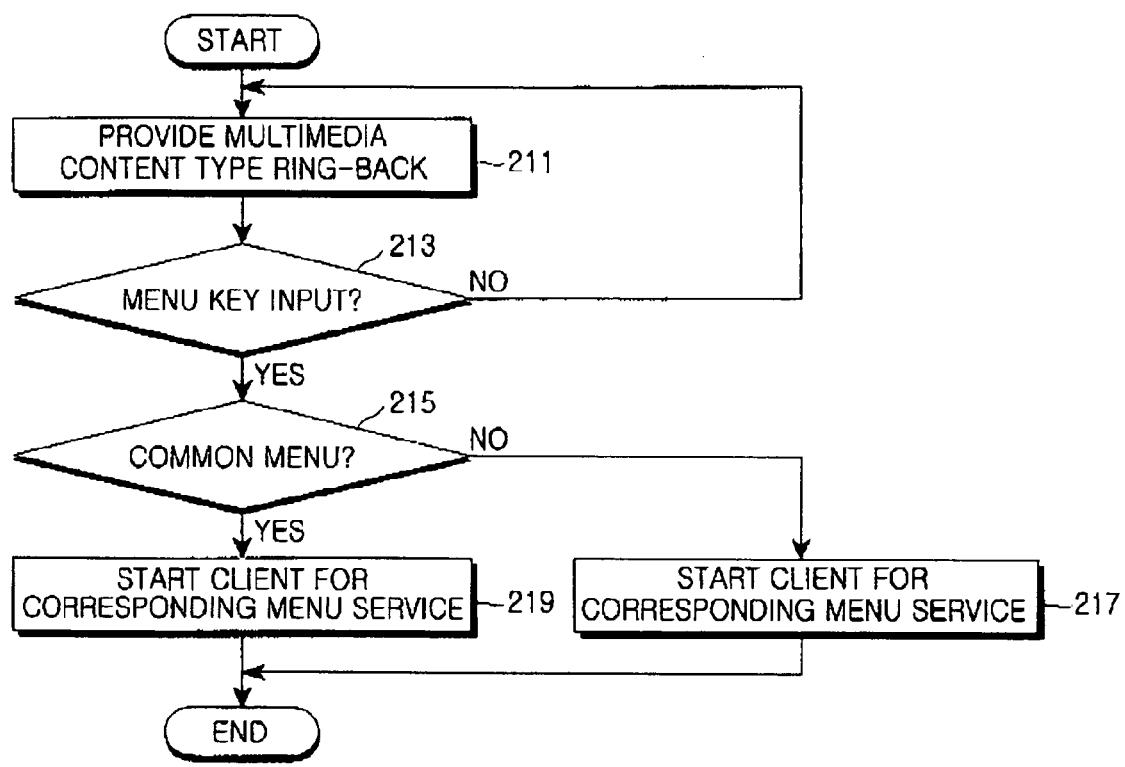
FIG. 2 is a flowchart illustrating an operation of providing a ring-back in a communication system that provides multimedia content type alerting according to the present invention.

FIG. 2 is a flowchart illustrating an operation of providing a ring-back in a communication system that provides multimedia content type alerting according to the present invention.

Referring to FIG. 2, in step 211, an origination terminal 110 provides a multimedia content type ring-back in response a request for call setup to a destination terminal 120. The origination terminal 110 determines in step 213 if a menu key is input. If the origination terminal 110 sends an outgoing call to the destination terminal 120, then an origination IMS server 130, a destination IMS server 140 and a PIP server 150 provide, in association with each other, the multimedia content type ring-back preset by the origination terminal 110 and the PIP server 150, to the origination terminal 110. Although the multimedia content type ring-back preset by the origination terminal 110 and the PIP server 150 is provided to the origination terminal 110, a multimedia content type ring-back preset by the destination terminal 120 other than the origination terminal 110 can also be provided to the origination terminal 110. Because the multimedia content type ring-back can be realized with hypertext transfer protocol (HTTP), wireless application protocol (WAP) and flash animation in addition to the audio, video, image and message as described above, the multimedia content type ring-back includes therein menu keys used for selecting various functions. It will be assumed in FIG. 2 that the menu keys included in the multimedia content type ring-back include a PTA service menu key, an IM service menu key, a CONNECTION menu key, a CANCEL menu key, and other menu keys. The menu keys are mapped to their associated services on a one-to-one basis. Therefore, if a specific menu key is input, a service mapped to the input menu key is provided.

If it is determined in step 213 that no menu key is input while providing the multimedia content type ring-back, the origination terminal 110 returns to step 211 where it continuously provides the multimedia content type ring-back until there is a response from the destination terminal 120. If it is determined in step 213 that a menu key is input while providing the multimedia content type ring-back, the origination terminal 110 determines in step 215 if a menu corresponding to the input menu key is a common menu through service capability comparison with the destination terminal 120. The origination terminal 110 receives service capability information of the destination terminal 120 from the PIP server 150 during call setup.

If it is determined in step 215 that the menu corresponding to the input menu key is not the common menu through the service compatibility comparison with the destination terminal 120, the origination terminal 110 proceeds to step 217 where it initiates a corresponding client to start the service mapped to the input menu key and performs its succeeding procedures.

However, if it is determined in step 215 that the menu corresponding to the input menu key is the common menu through the service compatibility comparison with the destination terminal 120, the origination terminal 110 proceeds to step 219 where it initiates a client corresponding to the input menu key to provide the service mapped to the corresponding menu, and then ends the operation. The operation in step 219 differs according to the input menu key, which is one of a PTA service menu key, an IM service menu key, a CONNECTION menu key, and a CANCEL menu key in the multimedia content type ring-back. A detailed description thereof will be made herein below.

Figure 3:
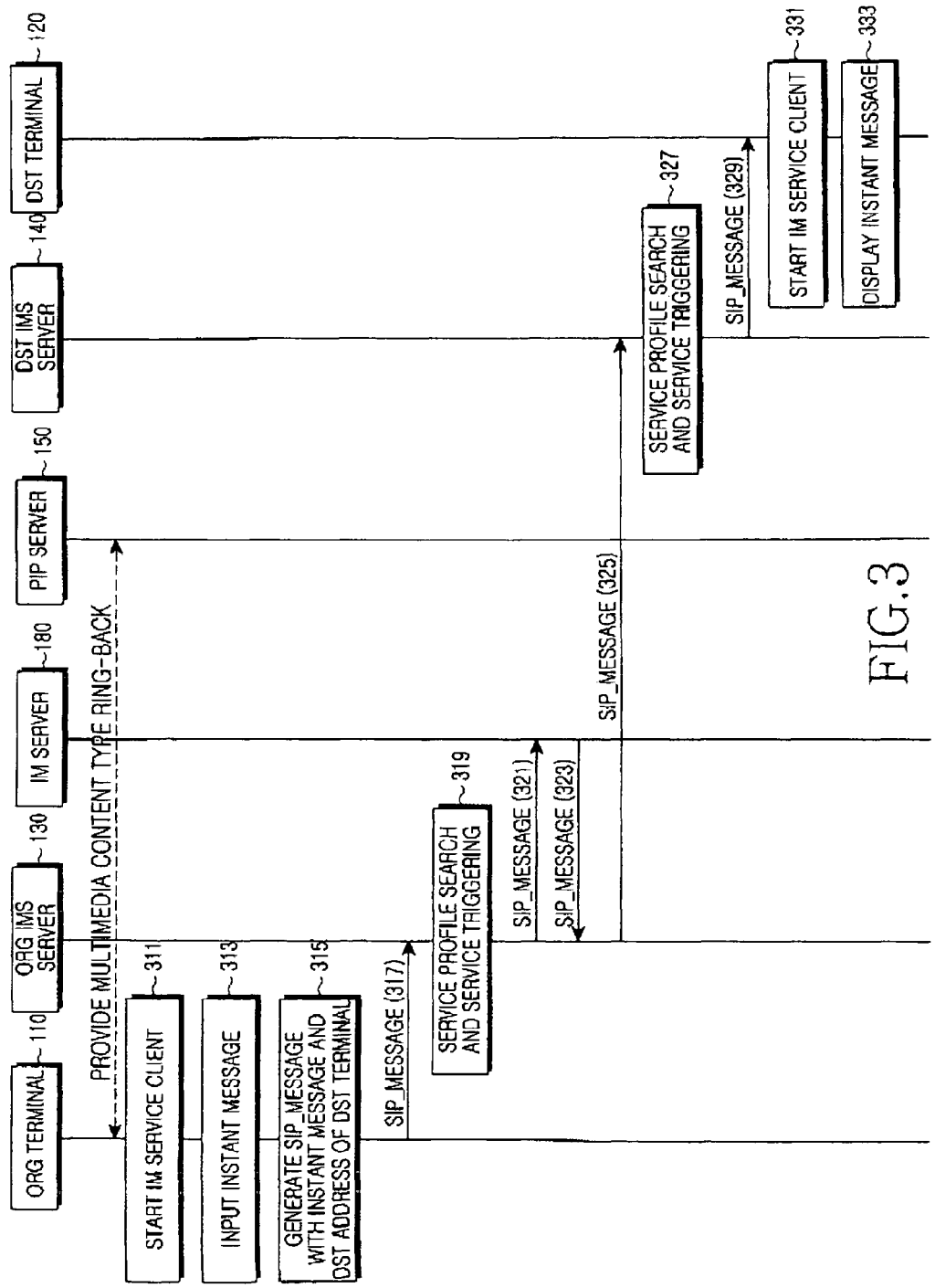
FIG. 3 is a signaling diagram illustrating an operation of providing a service in response to input of an IM service menu key of FIG. 2.

FIG. 3 is a signaling diagram illustrating an operation of providing a service in response to input of an IM service menu key in step 219 of FIG. 2.

The signaling diagram illustrated in FIG. 3 illustrates the service providing operation in step 219 of FIG. 2, performed when the origination (ORG) terminal 110 receives an IM service menu key while providing the multimedia content type ring-back. Referring to FIG. 3, the origination terminal 110 initiates an IM service client upon receipt of the IM service menu key in step 311. As the origination terminal 110 starts the IM service client, an IM service client tool for instant message input is displayed on a multimedia content type ring-back of the origination terminal 110, and the origination terminal 110 receives from its user an instant message to be transmitted to a destination (DST) terminal 120 in step 313. Upon receipt of the instant message to be transmitted to the destination terminal 120, the origination terminal 110 generates an SIP message including the received instant message and a destination address of the destination terminal 120 to which the origination terminal 110 sends an outgoing call, in step 315. The destination address of the destination terminal 120 can be acquired from a current call session with the destination terminal 120. The destination address is a Unified Resource Identifier (SIP URI) or a Unified Resource Identifier (TEL URI). It will be assumed in FIG. 3 that an SIP_MESSAGE scheme is used as an SIP scheme for an IM service. Schemes other than the SIP_MESSAGE scheme are also contemplated. The SIP scheme is classified into SIP_MESSAGE scheme, SIP_INVITE scheme, SIP_CANCEL scheme, SIP_480 (Temporarily Unavailable) scheme, etc. The SIP scheme is not directly related to the gist of the present invention, so a detailed description thereof will be omitted.

The origination terminal 110 sends the generated SIP_MESSAGE message to an origination IMS server 130 to request IM call setup in step 317. Upon receipt of the SIP_MESSAGE message from the origination terminal 110, the origination IMS server 130 searches a service profile of the origination terminal 110 and performs service triggering in step 319. That is, the origination IMS server 130 determines a service that it should provide to the origination terminal 110 through the service profile search, and should send a request for the corresponding service to an application server that manages the service to be provided to the origination terminal 110 according to the determination result. In FIG. 3, because the origination terminal 110 requests the IM service, the origination IMS server 130 should send a request for the IM service for the origination terminal 110 to an IM server 180. Therefore, the origination IMS server 130 sends the SIP_MESSAGE message received from the origination terminal 110 to the IM server 180 to request the IM service for the origination terminal 110 in step 321.

Upon receipt of the SIM_MESSAGE message from the origination IMS server 130, the IM server 180 sends the received SIP_MESSAGE message back to the origination IMS server 130 in response thereto in step 323. Upon receipt of the SIP_MESSAGE message from the IM server 180, the origination IMS server 130 sends the received SIP_MESSAGE message to a destination IMS server 140 to which the destination terminal 120 is connected, in step 325.

Upon receipt of the SIP_MESSAGE message from the origination IMS server 130, the destination IMS server 140 searches a service profile of the destination terminal 120, and performs service triggering in step 327. That is, the destination IMS server 140 determines a service that it should provide to the destination terminal 120 through the service profile search, and performs service triggering to the destination terminal 120 according to the determination result. In FIG. 3, because the destination IMS server 140 should provide the IM service, it triggers the received SIP_MESSAGE message to the destination terminal 120 in step 329.

The destination terminal 120 receives the SIP_MESSAGE message from the destination IMS server 140 while providing a multimedia content type bell in response to the outgoing call of the origination terminal 110, and upon receipt of the message, starts a client for the IM service in step 331. As the destination terminal 120 starts the client for the IM service, an IM service client tool for instant message displaying is displayed on a multimedia content type ring-back of the destination terminal 120, and the destination terminal 120 displays the instant message input by the user of the origination terminal 110 in step 333.

Figure 4:
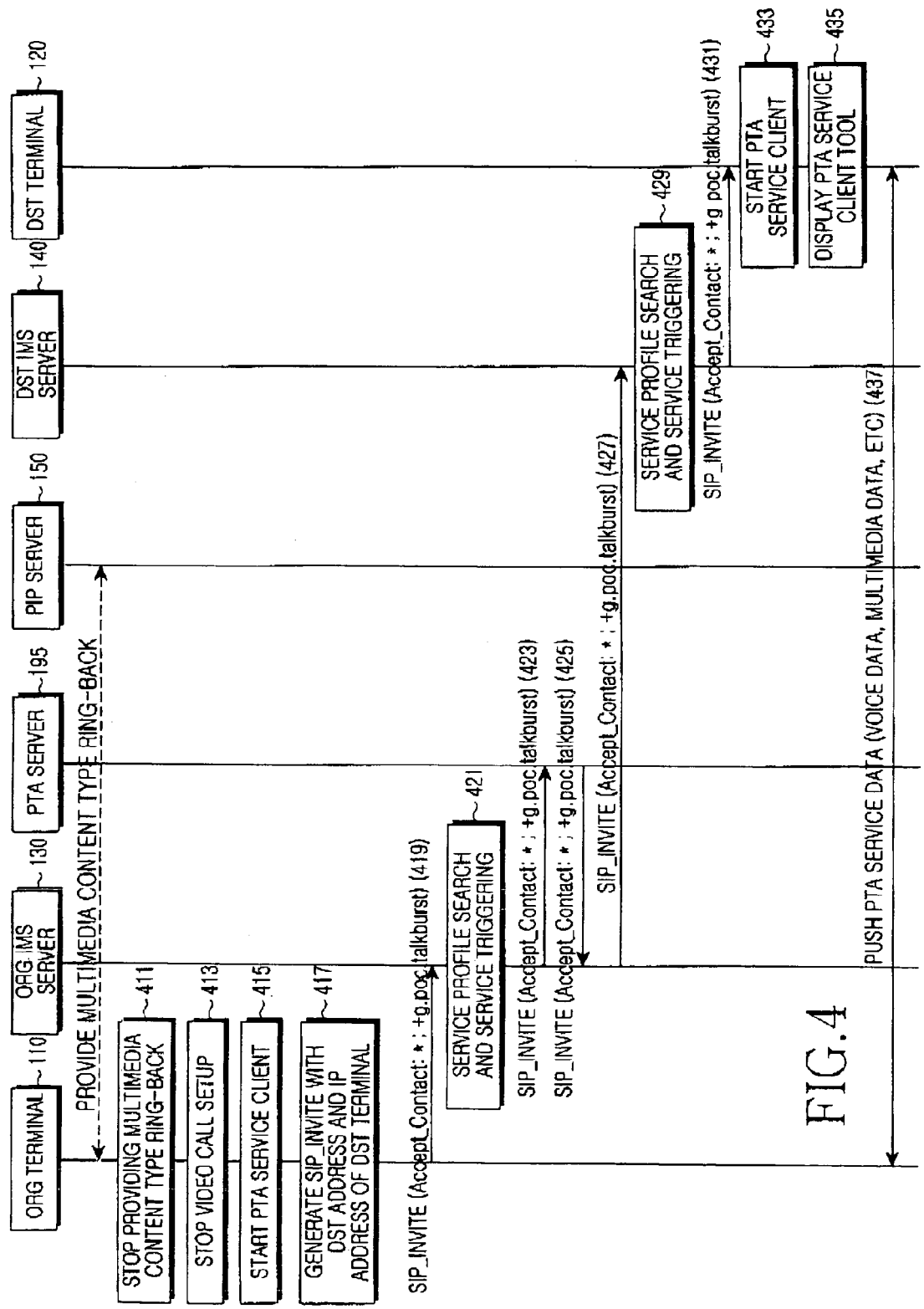
FIG. 4 is a signaling diagram illustrating an operation of providing a service in response to input of a PTA service menu key of FIG. 2.

FIG. 4 is a signaling diagram illustrating an operation of providing a service in response to input of a PTA service menu key in step 219 of FIG. 2.

The signaling diagram illustrated in FIG. 4 shows the service providing operation in step 219 of FIG. 2, performed when the origination terminal 110 receives a PTA service menu key while providing the multimedia content type ring-back. Referring to FIG. 4, upon receipt of the PTA service menu key, the origination terminal 110 stops providing the multimedia content type ring-back in step 411, and stops its video call setup procedure that it is performing in response to the request for video call setup to the destination terminal 120, in step 413. Although it is assumed in FIG. 4 that upon receipt of the PTA service menu key, the origination terminal 110 stops providing the multimedia content type ring-back and also stops the video call setup procedure, the origination terminal 110 is capable of stopping only the multimedia content type ring-back and maintaining the video call setup procedure.

After stopping even the video call setup procedure, because the PTA service menu key is input, the origination terminal 110 starts a PTA service client in step 415. As the origination terminal 110 starts the PTA service client, a PTA service client tool is displayed on a multimedia content type ring-back of the origination terminal 110. The origination terminal 110 generates an SIP message including a destination address and an IP address of the destination terminal 120 to which the origination terminal 110 sends an outgoing call, in step 417. It will be assumed in FIG. 4 that an SIP_INVITE scheme is used as the SIP scheme for the PTA service. Schemes other than the SIP_INVITE scheme are contemplated.

The origination terminal 110 includes, in the SIP_INVITE message for the PTA service, not only the destination address and IP address of the destination terminal 120 but also a parameter Accept_Contact: *; +g.poc.talkburst indicating an accept condition for the PTA service. The parameter Accept_Contact: *; +g.poc.talkburst is a parameter needed by an origination IMS server 130 to perform triggering to a PTA server 195 on the SIP_INVITE message having a header value coinciding with the parameter Accept_Contact: *; +g.poc.talkburst during service profile search and service triggering-related check.

The origination terminal 110 sends the generated SIP_INVITE message to the origination IMS server 130 to request PTA call setup in step 419. Upon receipt of the SIP_INVITE message from the origination terminal 110, the origination IMS server 130 searches a service profile of the origination terminal 110, and performs service triggering in step 421. The origination IMS server 130 determines which service it should provide to the origination terminal 110 through the service profile search, and provides the corresponding service to an application server that manages the service to be provided to the origination terminal 110 according to the determination result. In FIG. 4, because the origination terminal 110 requests the PTA service, the origination IMS server 130 should send a PTA service request for the origination terminal 110 to the PTA server 195. The origination IMS server 130 sends the SIP_INVITE message received from the origination terminal 110 to the PTA server 195 to request a PTA service for the origination terminal 110 in step 423.

Upon receipt of the SIP_INVITE message from the origination IMS server 130, the PTA server 195 sends the received SIP_INVITE message back to the origination IMS server 130 in response thereto in step 425. Upon receipt of the SIP_INVITE message from the PTA server 195, the origination IMS server 130 sends the received SIP_INVITE message to a destination IMS server 140 to which the destination terminal 120 is connected, in step 427.

Upon receipt of the SIP_INVITE message from the origination IMS server 130, the destination IMS server 140 searches a service profile of the destination terminal 120, and performs service triggering in step 429. The destination IMS server 140 determines a service that it should provide to the destination terminal 120 through the service profile search, and sends the message to the destination terminal 120 according to the determination result. In FIG. 4, because the destination IMS server 140 should provide the PTA service, the destination IMS server 140 sends the received SIP_INVITE message to the destination terminal 120 in step 431.

Upon receipt of the SIP_INVITE message from the destination IMS server 140, the destination terminal 120 starts a client for the PTA service in step 433. Although not separately illustrated in FIG. 4, if the origination terminal 110 starts the PTA service, the origination terminal 110 stops the current call setup procedure, so the destination terminal 120 also stops providing the multimedia content type bell. In addition, upon receipt of the SIP_INVITE message for the PTA call setup from the destination IMS server 140, the destination terminal 120 sends an SIP_UPDATE message in response to the PTA call setup. As the destination terminal 120 starts the PTA service client, it displays a PTA service client toll for the PTA service in step 435. If the PTA call is set up between the origination terminal 110 and the destination terminal 120 in this manner, i.e. if a bearer is set up between the origination terminal 110 and the destination terminal 120, the origination terminal 110 pushes, i.e. sends desired PTA service data, for example, voice and multimedia data, through the set bearer in step 437.

Figure 5:
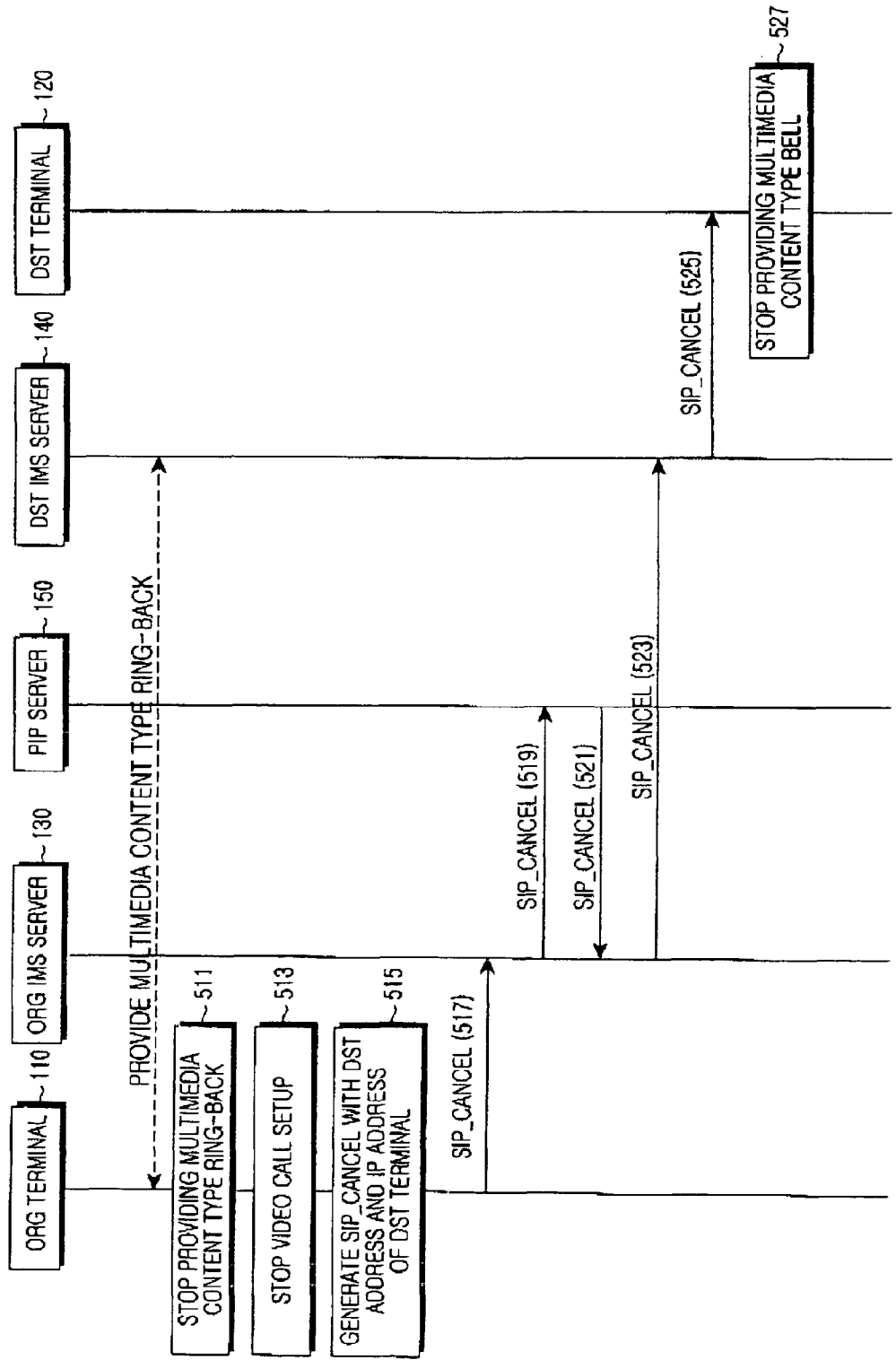
FIG. 5 is a signaling diagram illustrating an operation of providing a service in response to input of a CANCEL menu key of FIG. 2.

FIG. 5 is a signaling diagram illustrating an operation of providing a service in response to input of a CANCEL menu key in step 219 of FIG. 2.

The signaling diagram illustrated in FIG. 5 shows the service providing operation in step 219 of FIG. 2, performed when the origination terminal 110 receives a CANCEL menu key while providing the multimedia content type ring-back. Referring to FIG. 5, upon receipt of the CANCEL menu key, the origination terminal 110 stops providing the multimedia content type ring-back in step 511, and stops its video call setup procedure that it is performing in response to the request for video call setup to the destination terminal 120, in step 513.

In order to cancel the video call setup procedure, the origination terminal 110 generates an SIP message including a destination address and an IP address of the destination terminal 120 to which the origination terminal 110 sends an outgoing call, in step 515. It will be assumed in FIG. 5 that an SIP_CANCEL scheme is used as the SIP scheme for cancellation of the video call setup procedure, and another scheme other than the SIP_CANCEL scheme can also be used.

The origination terminal 110 sends the generated SIP_CANCEL message to an origination IMS server 130 to request cancellation of the video call setup procedure in step 517. Upon receipt of the SIP_CANCEL message from the origination terminal 110, the origination IMS server 130 sends the received SIP_CANCEL message to a PIP server 150 in step 519. Upon receipt of the SIP_CANCEL message from the origination IMS server 130, the PIP server 150 sends the received SIP_CANCEL message to the origination IMS server 130 in step 521. Upon receipt of the SIP_CANCEL message from the origination IMS server 130, the PIP server 150 releases the resources allocated to the origination terminal 110 for providing the multimedia content type ring-back.

Upon receipt of the SIP_CANCEL message from the PIP server 150, the origination IMS server 130 sends the received SIP_CANCEL message to a destination IMS server 140 in step 523. Upon receipt of the SIP_CANCEL message from the origination IMS server 130, the destination IMS server 140 sends the received SIP_CANCEL message to the destination terminal 120 in step 525. The destination terminal 120 receives the SIP_CANCEL message from the destination IMS server 140 while providing the multimedia content type bell in response to the outgoing call of the origination terminal 110, and upon receipt of the message, stops the multimedia content type bell and ends the video call setup procedure in step 527.

Figure 6:
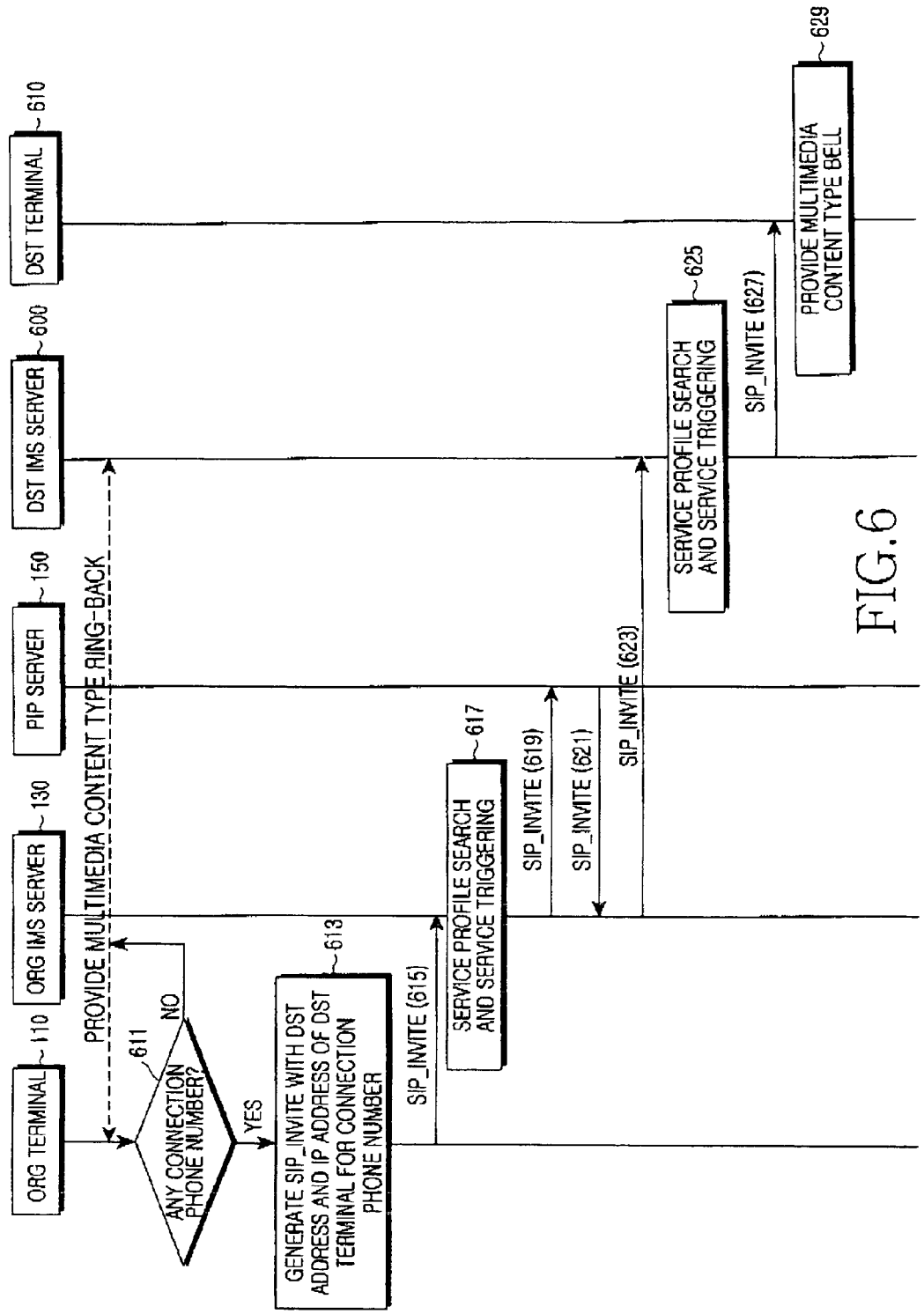
FIG. 6 is a signaling diagram illustrating an operation of providing a service in response to input of a CONNECTION menu key of FIG. 2.

FIG. 6 is a signaling diagram illustrating an operation of providing a service in response to input of a CONNECTION menu key in step 219 of FIG. 2.

The signaling diagram illustrated in FIG. 6 shows the service providing operation in step 219 of FIG. 2, performed when the origination terminal 110 receives a CONNECTION menu key while providing the multimedia content type ring-back. Referring to FIG. 6, upon receipt of the CONNECTION menu key, the origination terminal 110 determines in step 611 if there is any CONNECTION phone number preset in the origination terminal 110. If it is determined that there is no preset CONNECTION phone number, the origination terminal 110 provides the multimedia content type ring-back as it is.

However, if it is determined that there is a preset CONNECTION phone number, the origination terminal 110 generates an SIP message including a destination address and an IP address of a destination terminal 610 corresponding to the CONNECTION phone number in step 613. It will be assumed in FIG. 6 that an SIP_INVITE scheme is used as the SIP scheme for providing the CONNECTION menu. Schemes other than the SIP_INVITE scheme are contemplated. The destination terminal 610 is different from the destination terminal 120 described in FIG. 2, and the destination terminal 610 can be connected either to the destination IMS server 140 to which the destination terminal 120 is connected, or to a destination IMS server 600 different from the destination IMS server 140. It will be assumed in FIG. 6 that the destination terminal 610 is connected to the destination IMS server 600.

The origination terminal 110 sends the generated SIP_INVITE message to an origination IMS server 130 to request new video call setup in step 615. Upon receipt of the SIP_INVITE message from the origination terminal 110, the origination IMS server 130 searches a service profile of the origination terminal 110, and performs service triggering in step 617. The origination IMS server 130 determines a service that it should provide to the origination terminal 110 through the service profile search, and should send a request for the corresponding service to an application server that manages the service to be provided to the origination terminal 110 according to the determination result. In FIG. 6, because the origination terminal 110 requests new video call setup, the origination IMS server 130 should send a request for video call setup of the origination terminal 110 to a PIP server 150. The origination IMS server 130 sends the SIP_INVITE message received from the origination terminal 110 to the PIP server 150 to request video call setup for the origination terminal 110 in step 619.

Upon receipt of the SIP_INVITE message from the origination IMS server 130, the PIP server 150 sends the received SIP_INVITE message back to the origination IMS server 130 in response thereto in step 621. Upon receipt of the SIP_INVITE message from the PIP server 150, the origination IMS server 130 sends the received SIP_INVITE message to the destination IMS server 600 to which the destination terminal 610 is connected, in step 623.

Upon receipt of the SIP_INVITE message from the origination IMS server 130, the destination IMS server 600 searches a service profile of the destination terminal 610, and performs service triggering in step 625. The destination MS server 600 determines a service that it should provide to the destination terminal 610 through the service profile search, and sends the message to the destination terminal 610 according to the determination result. In FIG. 6, because the destination IMS server 600 should perform the video call setup, it sends the received SIP_INVITE message to the destination terminal 610 in step 627. Upon receipt of the SIP_INVITE message from the destination IMS server 600, the destination terminal 610 provides the multimedia content type bell provided from the PIP server 150 in step 629.

Figure 7:
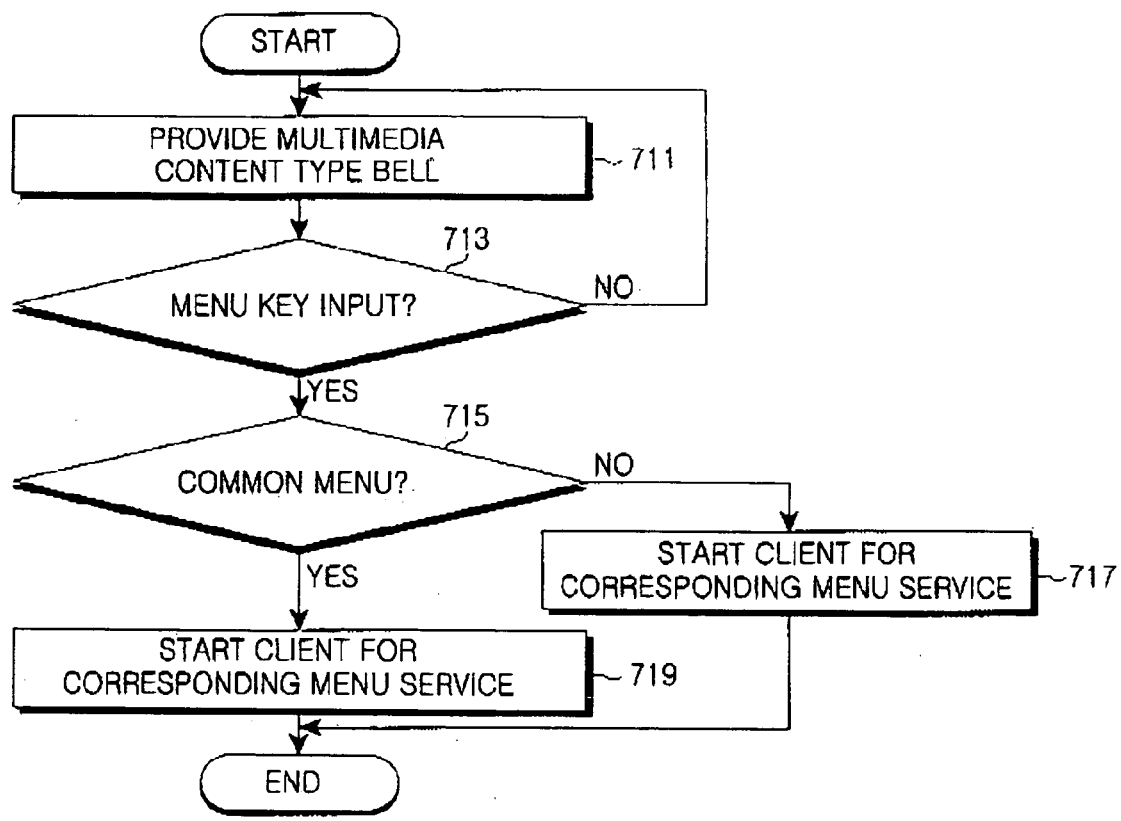
FIG. 7 is a flowchart illustrating an operation of providing a bell in a communication system that provides multimedia content type, alerting according to the present invention.

FIG. 7 is a flowchart illustrating an operation of providing a bell in a communication system that provides multimedia content type alerting according to the present invention.

Referring to FIG. 7, in step 711, a destination terminal 120 provides a multimedia content type bell in response a call setup request from an origination terminal 110. In the meantime, the destination terminal 120 determines in step 713 whether a menu key is input. A brief description will now be made of an operation in which the destination terminal 120 provides the multimedia content type bell. If the origination terminal 110 sends an outgoing call to the destination terminal 120, then an origination IMS server 130, a destination IMS server 140 and a PIP server 150 provide, in association with each other, the multimedia content type ring preset by the destination terminal 120 and the PIP server 150, to the destination terminal 120. Although the multimedia content type ring preset by the destination terminal 120 and the PIP server 150 is provided herein to the destination terminal 120, a multimedia content type ring preset by the origination terminal 110 other than the destination terminal 120 can also be provided to the destination terminal 120. Because the multimedia content type ring can be realized with HTTP, WAP and flash animation in addition to the audio, video, image and message as described above, the multimedia content type ring includes therein menu keys used for selecting various functions. It is assumed in FIG. 7 that the menu keys included in the multimedia content type ring include a PTA service menu key, an IM service menu key, a Voice Call menu key, a Video Call menu key, a REJECT menu key and other menu keys.

If it is determined in step 713 that no menu key is input while providing the multimedia content type bell, the destination terminal 120 returns to step 711 where it continuously provides the multimedia content type bell until there is a response from the destination terminal 120. If it is determined in step 713 that a menu key is input while providing the multimedia content type bell, the destination terminal 120 proceeds to step 715.

In step 715, the destination terminal 120 determines if a menu corresponding to the input menu key is a common menu through service capability comparison with the origination terminal 110. The destination terminal 120 receives service capability information of the origination terminal 110 from the PIP server 150 during call setup. If it is determined in step 715 that the menu corresponding to the input menu key is not the common menu through service capability comparison with the origination terminal 110, the destination terminal 120 proceeds to step 717 where it starts a corresponding client for starting the service corresponding to the input menu key, and then performs the succeeding procedures.

However, if it is determined in step 715 that the menu corresponding to the input menu key is the common menu through service capability comparison with the origination terminal 110, the destination terminal 120 proceeds to step 719 where it starts a client corresponding to the input menu key to provide a service mapped to the corresponding menu, and then ends the operation. The operation in step 719 differs according to the input menu key which is one of a PTA service menu key, an IM service menu key, a Voice Call menu key, a Video Call menu key, and a REJECT menu key in the multimedia content type bell (or ring). A detailed description thereof will be made herein below.

Figure 8:
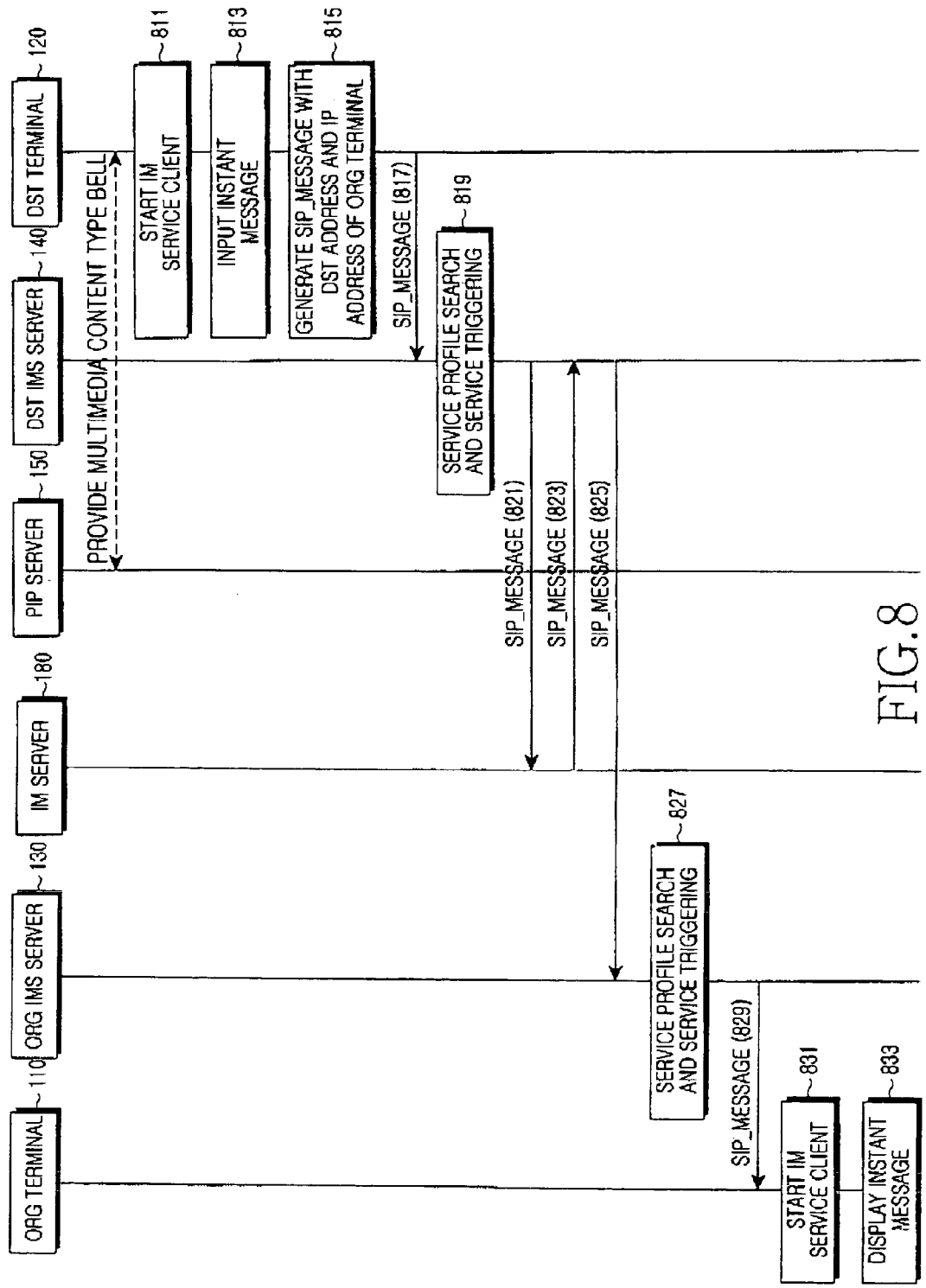
FIG. 8 is a signaling diagram illustrating an operation of providing a service in response to input of an IM service menu key of FIG. 7.

FIG. 8 is a signaling diagram illustrating an operation of providing a service in response to input of an IM service menu key in step 719 of FIG. 7.

The signaling diagram illustrated in FIG. 8 shows the service providing operation in step 719 of FIG. 7, performed when a destination (DST) terminal 120 receives an IM service menu key while providing the multimedia content type bell. Referring to FIG. 8, the destination terminal 120 starts an IM service client upon receipt of the IM service menu key in step 811. As the destination terminal 120 starts the IM service client, an IM service client tool for instant message inputting is displayed on a multimedia content type bell of the destination terminal 120, and the destination terminal 120 receives from its user an instant message to be transmitted to an origination (ORG) terminal 110 in step 813. Upon receipt of the instant message to be transmitted to the origination terminal 110, the destination terminal 120 generates an SIP message including the received instant message and a destination address and an IP address of the origination terminal 110 from which the destination terminal 120 receives an incoming call, in step 815. It will be assumed in FIG. 8 that an SIP_MESSAGE scheme is used as an SIP scheme for an IM service, and another scheme other than the SIP_MESSAGE scheme can also be used.

The destination terminal 120 sends the generated SIP_MESSAGE message to a destination IMS server 140 to request IM call setup in step 817. Upon receipt of the SIP_MESSAGE message from the destination terminal 120, the destination IMS server 140 searches a service profile of the destination terminal 120, and performs service triggering in step 819. The destination IMS server 140 determines a service that it should provide to the destination terminal 120 through the service profile search, and should send, a request for the corresponding service to an application server that manages the service to be provided to the destination terminal 120 according to the determination result. In FIG. 8, because the destination terminal 120 requests the IM service, the destination IMS server 140 should send an IM service request for the destination terminal 120 to an IM server 180. The destination IMS server 140 sends the SIP_MESSAGE message received from the destination terminal 120 to the IM server 180 to request the IM service for the destination terminal 120 in step 821.

Upon receipt of the SIP_MESSAGE message from the destination IMS server 140, the IM server 180 sends the received SIP_MESSAGE message back to the destination IMS server 140 in response thereto in step 823. Upon receipt of the SIP_MESSAGE message from the IM server 180, the destination IMS server 140 sends the received SIP_MESSAGE message to an origination IMS server 130 to which the origination terminal 110 is connected, in step 825.

Upon receipt of the SIP_MESSAGE message from the destination IMS server 140, the origination IMS server 130 searches a service profile of the origination terminal 110, and performs service triggering in step 827. The origination IMS server 130 determines a service that it should provide to the origination terminal 110 through the service profile search, and sends the message to the origination terminal 110 according to the determination result. In FIG. 8, because the origination IMS server 130 should provide the IM service, it sends the received SIP_MESSAGE message to the origination terminal 110 in step 829.

The origination terminal 110 receives the SIP_MESSAGE message from the origination IMS server 130 while providing the multimedia content type ring-back due to the outgoing call to the destination terminal 120, and upon receipt of the message, starts a client for the IM service in step 831. As the origination terminal 110 starts the IM service client, an IM service client tool for instant message displaying is displayed on a multimedia content type ring-back of the origination terminal 110, and in step 833 the origination terminal 110 displays the instant message input by the user of the destination terminal 120.

Figure 9:
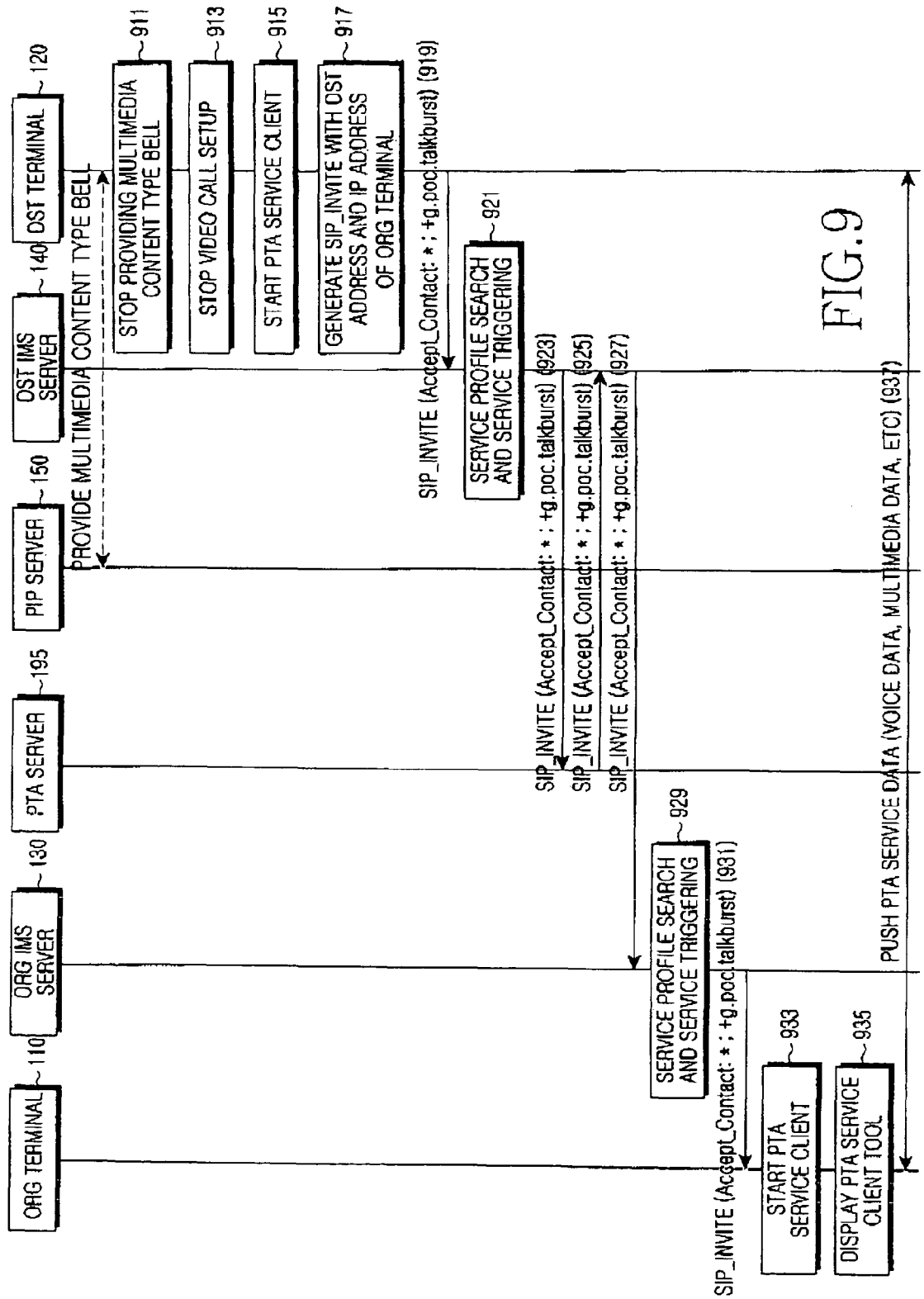
FIG. 9 is a signaling diagram illustrating an operation of providing a service in response to input of a PTA service menu key of FIG. 7.

FIG. 9 is a signaling diagram illustrating an operation of providing a service in response to input of a PTA service menu key in step 719 of FIG. 7.

The signaling diagram illustrated in FIG. 9 shows the service providing operation in step 719 of FIG. 7, performed when the destination terminal 120 receives a PTA service menu key while providing the multimedia content type bell. Referring to FIG. 9, the destination terminal 120 stops providing the multimedia content type bell upon receipt of the PTA service menu key in step 911, and stops its video call setup procedure in response to a video call setup request from an origination terminal 110 in step 913. Although it is assumed in FIG. 9 that upon receipt of the PTA service menu key, the destination terminal 120 stops providing the multimedia content type bell and also stops the video call setup procedure, the destination terminal 120 is capable of stopping only the multimedia content type bell and maintaining the video call setup procedure.

After stopping even the video call setup procedure, because the PTA service menu key is input, the destination terminal 120 starts a PTA service client in step 915. As the destination terminal 120 starts the PTA service client, a PTA service client tool is displayed on a multimedia content type bell of the destination terminal 120. The destination terminal 120 generates an SIP message including a destination address and an IP address of the origination terminal 110 from which the destination terminal 120 receives an incoming call, in step 917. It will be assumed in FIG. 9 that an SIP_INVITE scheme is used as the SIP scheme for the PTA service, and another scheme other than the SIP_INVITE scheme can also be used. The destination terminal 120 includes, in the SIP_INVITE message for the PTA service, not only the destination address and IP address of the origination terminal 110 but also a parameter Accept_Contact: *; +g.poc.talkburst indicating an accept condition for the PTA service. The parameter Accept_Contact: *; +g.poc.talkburst is a parameter needed by a destination IMS server 140 to perform triggering to a PTA server 195 on the SIP_INVITE message having a header value coinciding with the parameter Accept_Contact: *; +g.poc.talkburst during service profile search and service triggering-related check.

The destination terminal 120 sends the generated SIP_INVITE message to the destination IMS server 140 to request PTA call setup in step 919. Upon receipt of the SIP_INVITE message from the destination terminal 120, the destination IMS server 140 searches a service profile of the destination terminal 120, and performs service triggering in step 921. The destination IMS server 140 determines a service that it should provide to the destination terminal 120 through the service profile search, and should send a request for the corresponding service to an application server that manages the service to be provided to the destination terminal 120 according to the determination result. In FIG. 9, because the destination terminal 120 requests the PTA service, the destination IMS server 140 should send a PTA service request for the destination terminal 120 to the PTA server 195. The destination IMS server 140 sends the SIP_INVITE message received from the destination terminal 120 to the PTA server 195 to request the PTA service for the destination terminal 120 in step 923.

Upon receipt of the SIP_INVITE message from the destination IMS server 140, the PTA server 195 sends the received SIP_INVITE message back to the destination IMS server 140 in response thereto in step 925. Upon receipt of the SIP_INVITE message from the PTA server 195, the destination IMS server 140 sends the received SIP_INVITE message to an origination IMS server 130 to which the origination terminal 110 is connected, in step 927.

Upon receipt of the SIP_INVITE message from the destination IMS server 140, the origination IMS server 130 searches a service profile of the origination terminal 110, and performs service triggering in step 929. The origination IMS server 130 determines which service it should provide to the origination terminal 110 through the service profile search, and sends the message to the origination terminal 110 according to the determination result. In FIG. 9, because the origination IMS server 130 should provide the PTA service, it sends the received SIP_INVITE message to the origination terminal 110 in step 931.

Upon receipt of the SIP_INVITE message from the origination IMS server 130, the origination terminal 110 starts a client for the PTA service in step 933. Although not separately illustrated in FIG. 9, if the destination terminal 120 starts the PTA service, it stops the current call setup procedure, so the origination terminal 110 also stops providing the multimedia content type ring-back. In addition, upon receipt of the SIP_INVITE message for the PTA call setup from the origination IMS server 130, the origination terminal 110 sends an SIP_UPDATE message in response to the PTA call setup.

As the origination terminal 110 starts the PTA service client, it displays a PTA service client tool for the PTA service in step 935. If a PTA call is set up between the origination terminal 10 and the destination terminal 120 in this way, i.e. if a bearer is set up between the origination terminal 110 and the destination terminal 120, the destination terminal 120 pushes, i.e. sends, desired PTA service data, for example, voice and multimedia data, through the set bearer in step 937.

Figure 10:
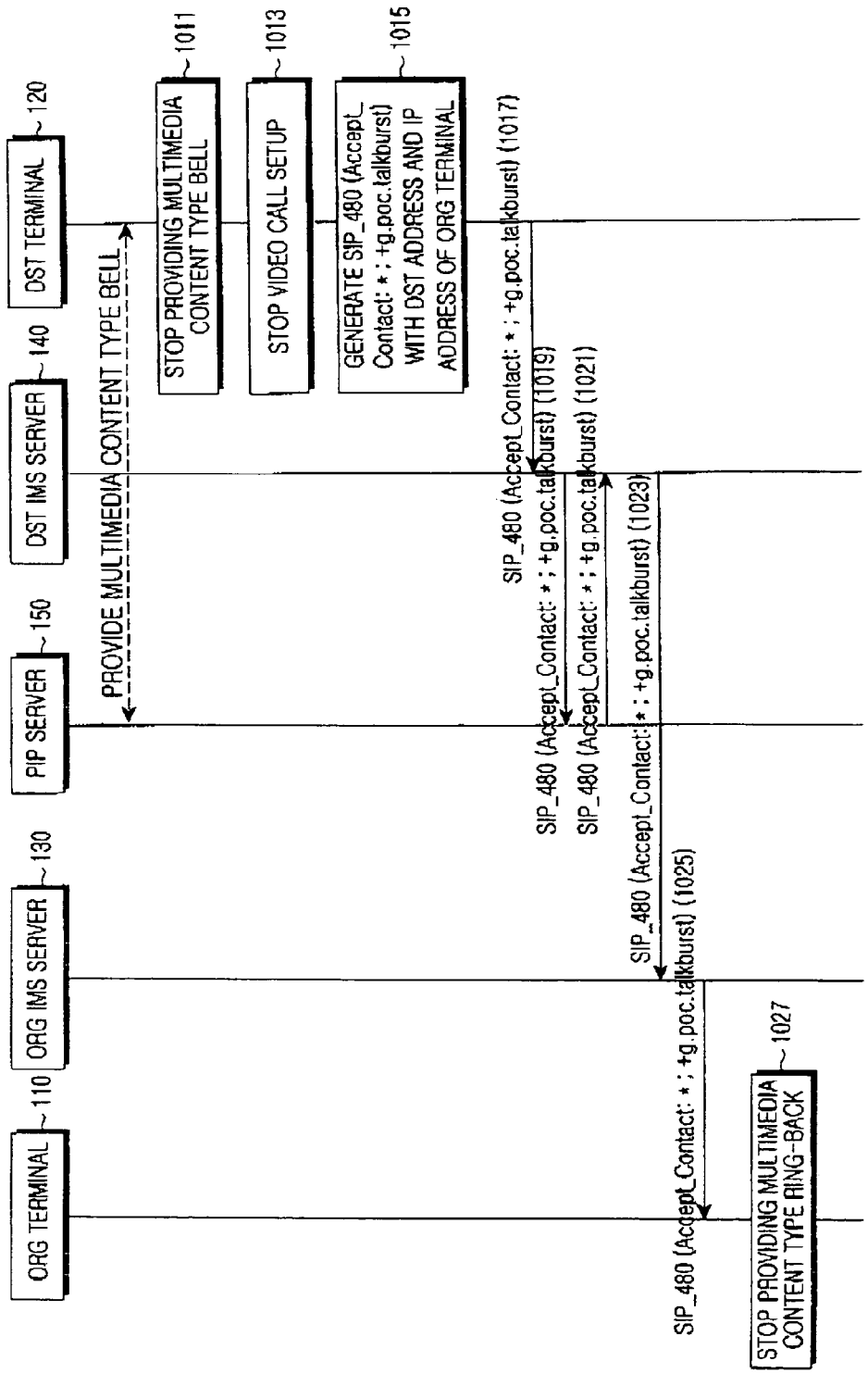
FIG. 10 is a signaling diagram illustrating an operation of providing a service in response to input of a REJECT menu key of FIG. 7.

FIG. 10 is a signaling diagram illustrating an operation of providing a service in response to input of a REJECT menu key in step 719 of FIG. 7.

The signaling diagram illustrated in FIG. 10 shows the service providing operation in step 719 of FIG. 7, performed when the destination terminal 120 receives a REJECT menu key while providing the multimedia content type bell. Referring to FIG. 10, upon receipt of the REJECT menu key, the destination terminal 120 stops providing the multimedia content type bell in step 1011, and stops its video call setup procedure that it is performing in response to the video call setup request of an origination terminal 110, in step 1013.

In order to reject the video call setup procedure, the destination terminal 120 generates an SIP message including a destination address and an IP address of the origination terminal 110 from which the destination terminal 120 receives an incoming call, in step 1015. It will be assumed in FIG. 10 that an SIP_480 (Temporarily Unavailable) scheme is used as the SIP scheme for rejecting the video call setup procedure, and another scheme other than the SIP_480 (Temporarily Unavailable) scheme can also be used. The destination terminal 120 sends the generated SIP_480 (Temporarily Unavailable) message to a destination IMS server 140 to request rejection of the video call setup procedure in step 1017. Upon receipt of the SIP_480 (Temporarily Unavailable) message from the destination terminal 120, the destination IMS server 140 sends the received SIP_480 (Temporarily Unavailable) message to a PIP server 150 in step 1019. Upon receipt of the SIP_480 (Temporarily Unavailable) message from the destination IMS server 140, the PIP server 150 sends the received SIP_480 (Temporarily Unavailable) message back to the destination IMS server 140 in step 1021. Upon receipt of the SIP_480 (Temporarily Unavailable) message from the destination IMS server 140, the PIP server 150 releases the resources allocated to the destination terminal 120 for providing the multimedia content type bell.

Upon receipt of the SIP_480 (Temporarily Unavailable) message from the PIP server 150, the destination IMS server 140 sends the received SIP_480 (Temporarily Unavailable) message to an origination IMS server 130 in step 1023. Upon receipt of the SIP_480 (Temporarily Unavailable) message from the destination IMS server 140, the origination IMS server 130 sends the received SIP_480 (Temporarily Unavailable) message to an origination terminal 110 in step 1025. The origination terminal 110 receives the SIP_480 (Temporarily Unavailable) message from the origination IMS server 130 while providing the multimedia content type ring-back due to the outgoing call to the destination terminal 120, and upon receipt of the message, stops providing the multimedia content type ring-back and ends the call setup procedure in step 1027.

Figure 11:
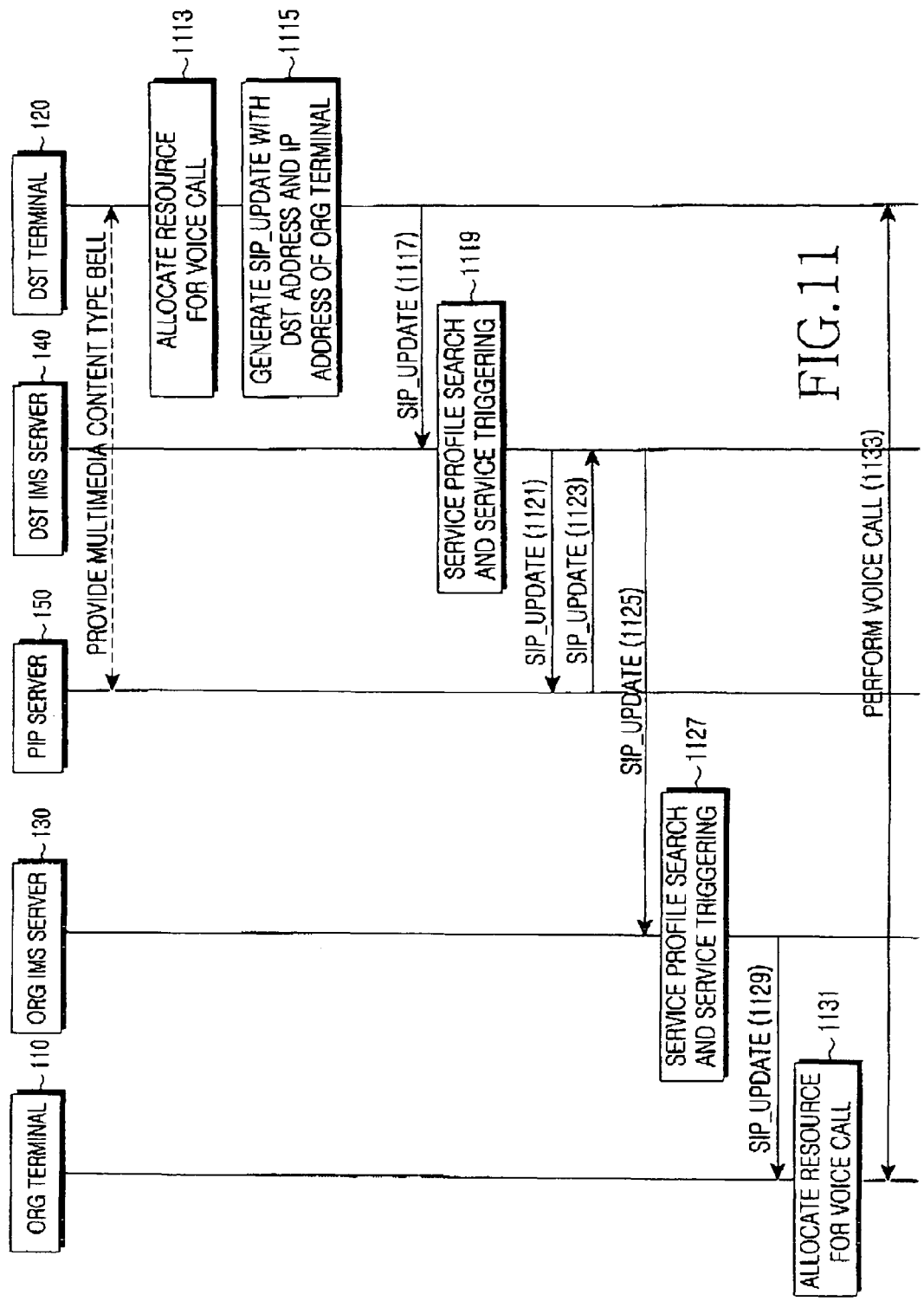
FIG. 11 is a signaling diagram illustrating an operation of providing a service in response to input of a Voice Call menu key of FIG. 7.

FIG. 11 is a signaling diagram illustrating an operation of providing a service in response to input of a Voice Call menu key in step 719 of FIG. 7.

The signaling diagram illustrated in FIG. 11 shows the service providing operation in step 719 of FIG. 7, performed when the destination terminal 120 receives a Voice Call menu key while providing the multimedia content type bell. Referring to FIG. 11, upon receipt of the Voice Call menu key, the destination terminal 120 allocates resources for a voice call in step 1113. For the voice call, the destination terminal 120 generates an SIP message including a destination address and an IP address of an origination terminal 110 from which the destination terminal 120 receives an incoming call, in step 1115. It will be assumed in FIG. 11 that an SIP_UPDATE scheme is used as the SIP scheme for voice call. Scheme other than the SIP_UPDATE scheme are contemplated.

The destination terminal 120 sends the generated SIP_UPDATE message to a destination IMS server 140 to request connection of the voice call in step 1117. Upon receipt of the SIP_UPDATE message from the destination terminal 120, the destination IMS server 140 searches a service profile of the destination terminal 120, and performs service triggering in step 1119. That is, the destination IMS server 140 determines a service that it should provide to the destination terminal 120 through the service profile search, and should send a request for the corresponding service to an application server that manages the service to be provided to the destination terminal 120 according to the determination result. In FIG. 11, because the destination terminal 120 requests voice channel resource connection, the destination IMS server 140 should send a request for voice channel resource connection for the destination terminal 120 to a PIP server 150. The destination IMS server 140 sends the SIP_UPDATE message received from the destination terminal 120 to the PIP server 150 to request voice channel resource connection for the destination terminal 120 in step 1121.

Upon receipt of the SIP_UPDATE message from the destination IMS server 140, the PIP server 150 sends the received SIP_UPDATE message back to the destination IMS server 140 in response thereto in step 1123. Upon receipt of the SIP_UPDATE message from the PIP server 150, the destination IMS server 140 sends the received SIP_UPDATE message to an origination IMS server 130 to which the origination terminal 110 is connected, in step 1125.

Upon receipt of the SIP_UPDATE message from the destination IMS server 140, the origination IMS server 130 searches a service profile of the origination terminal 110, and performs service triggering in step 1127. The origination IMS server 130 determines a service that it should provide to the origination terminal 110 through the service profile search, and sends the message to the origination terminal 110 according to the determination result. In FIG. 11, because the origination IMS server 130 should provide the voice channel connection, it sends the received SIP_UPDATE message to the origination terminal 110 in step 1129.

Upon receipt of the SIP_UPDATE message from the origination IMS server 130, the origination terminal 110 allocates the resources for the voice call connection in step 1131. If the resource allocation for the voice call connection by the origination terminal 110 is completed in this way, a voice call is performed between the origination terminal 110 and the destination terminal 120 in step 1133.

Figure 12:
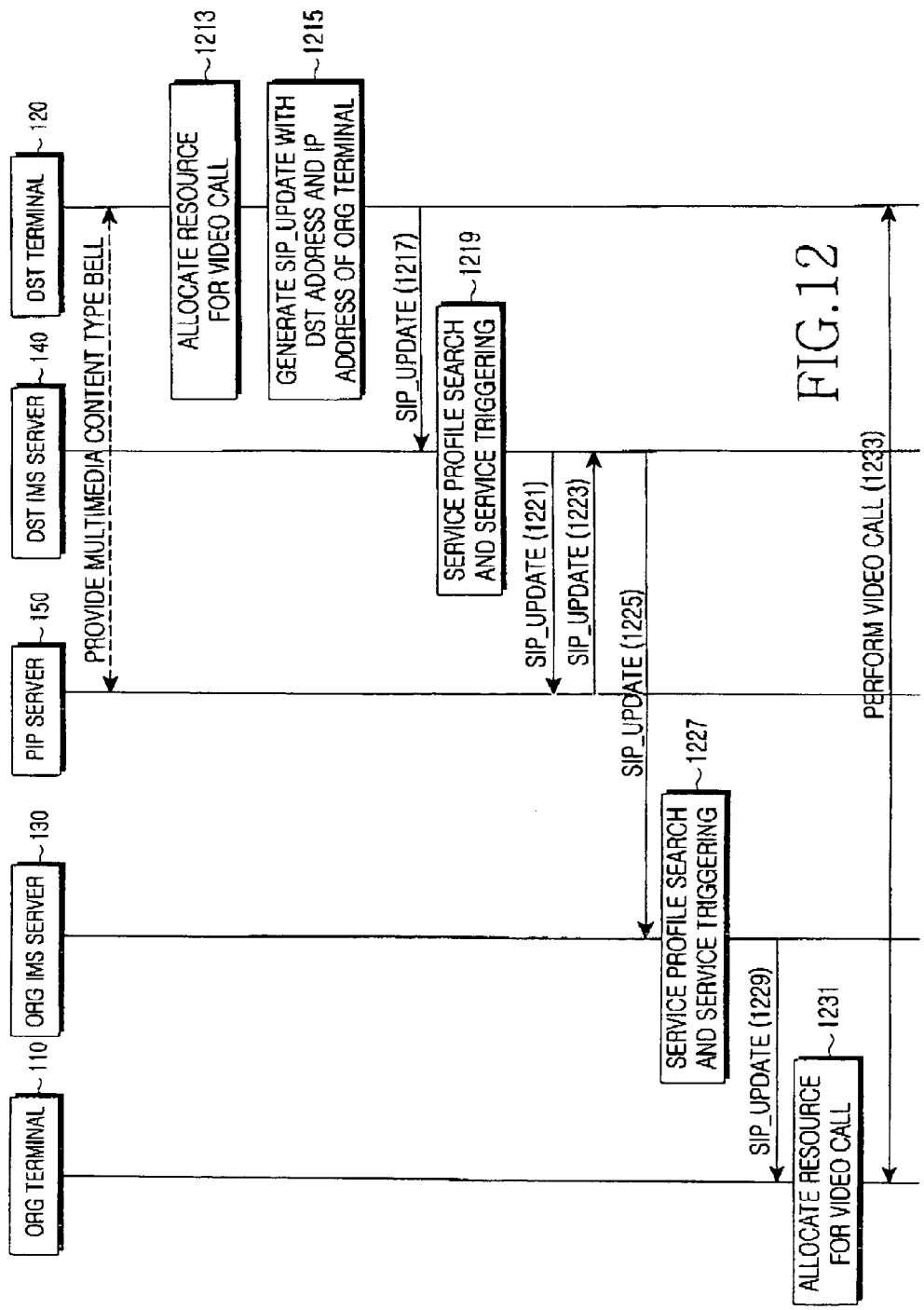
FIG. 12 is a signaling diagram illustrating an operation of providing a service in response to input of a Video Call menu key of FIG. 7.

FIG. 12 is a signaling diagram illustrating an operation of providing a service in response to input of a Video Call menu key in step 719 of FIG. 7.

The signaling diagram illustrated in FIG. 12 shows the service providing operation in step 719 of FIG. 7, performed when the destination terminal 120 receives a Video Call menu key while providing the multimedia content type bell. Referring to FIG. 12, the destination terminal 120 allocates resources for a video call upon receipt of the Video Call menu key in step 1213. For the video call, the destination terminal 120 generates an SIP message including a destination address and an IP address of an origination terminal 110 from which it receives an incoming call, in step 1215. It will be assumed in FIG. 12 that an SIP_UPDATE scheme is used as the SIP scheme for the video call. Scheme other than the SIP_UPDATE scheme are contemplated.

The destination terminal 120 sends the generated SIP_UPDATE message to a destination IMS server 140 to request video channel resource connection in step 1217. Upon receipt of the SIP_UPDATE message from the destination terminal 120, the destination IMS server 140 searches a service profile of the destination terminal 120, and performs service triggering in step 1219. That is, the destination IMS server 140 determines a service that it should provide to the destination terminal 120 through the service profile search, and should send a request for the corresponding service to an application server that manages the service to be provided to the destination terminal 120 according to the determination result. In FIG. 12, because the destination terminal 120 requests the video channel resource connection, the destination IMS server 140 should send a video call connection request for the destination terminal 120 to a PIP server 150. The destination IMS server 140 sends the SIP_UPDATE message received from the destination terminal 120 to the PIP server 150 to request video call connection for the destination terminal 120 in step 1221.

Upon receipt of the SIP_UPDATE message from the destination IMS server 140, the PIP server 150 sends the received SIP_UPDATE message back to the destination IMS server 140 in response thereto in step 1223. Upon receipt of the SIP_UPDATE message from the PIP server 150, the destination IMS server 140 sends the received SIP_UPDATE message to an origination IMS server 130 to which the origination terminal 110 is connected, in step 1225.

Upon receipt of the SIP_UPDATE message from the destination IMS server 140, the origination IMS server 130 searches a service profile of the origination terminal 110, and performs service triggering in step 1227. The origination IMS server 130 determines a service that it should provide to the origination terminal 110 through the service profile search, and sends the message to the origination terminal 110 according to the determination result. In FIG. 12, because the origination IMS server 130 should provide the video call connection, it sends the received SIP_UPDATE message to the origination terminal 110 in step 1229.

Upon receipt of the SIP_UPDATE message from the origination IMS server 130, the origination terminal 110 allocates resources for the video call connection in step 1231. If the resource allocation for the video call connection by the origination terminal 110 is completed in this way, a video call is performed between the origination terminal 110 and the destination terminal 120 in step 1233.

As can be understood from the foregoing description, the communication system according to the present invention provides multimedia content type alerting, thereby providing a differentiated service according to need and taste of the terminal user.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for providing a multimedia content type ring-back by an origination terminal in a communication system, the method comprising:
providing a multimedia content type ring-back including menu keys mapped to services; and
upon receipt of a particular menu key while providing the multimedia content type ring-back providing a service mapped to the particular menu key,
wherein providing the service comprises initiating a client to perform the service, which can be performed with a destination terminal, if the service is capable of being provided to the destination terminal.

2. The method of claim 1, wherein providing the service comprises initiating a client to perform the service if the service is not capable of being provided to the destination terminal.

3. The method of claim 1, wherein the possible services include at least one of a Push-To-All (PTA) service, an Instant Messaging (IM) service, a Connection service, and a Cancel service.

4. The method of claim 3, wherein if the service mapped to the particular menu key is an IM service and the IM service is capable of being provided to the destination terminal, providing the IM service comprises:
starting an IM service client;
receiving an instant message to be sent to the destination terminal;
detecting a destination address of the destination terminal from a current call session, and generating a first message including the destination address and the instant message; and
transmitting the first message to the destination terminal so that the instant message is displayed on the destination terminal.

5. The method of claim 4, wherein the first message is generated using a Session Initiation Protocol (SIP)_MESSAGE scheme.

6. The method of claim 3, wherein if the service mapped to the particular menu key is the PTA service and the PTA service is capable of being provided to the destination terminal, providing the PTA service comprises:
stopping providing the multimedia content type ring-back;
starting a PTA service client;
generating a first message including a destination address of the destination terminal for PTA call setup;
transmitting the first message to the destination terminal so that the PTA call is set up with the destination terminal; and
pushing PTA service data through a PTA call if the PTA call is set up with the destination terminal.

7. The method of claim 6, further comprising stopping a current call setup after stopping the multimedia content type ring-back.

8. The method of claim 7, wherein the first message is generated using an SIP_INVITE scheme.

9. The method of claim 3, wherein if the service mapped to the particular menu key is a Cancel service and the Cancel service is capable of being provided to the destination terminal, providing the Cancel service comprises:
stopping providing the multimedia content type ring-back and stopping a current call setup;
generating a first message including a destination address of the destination terminal to cancel the call setup; and
transmitting the first message to the destination terminal so that the call setup is canceled.

10. The method of claim 9, wherein the first message is generated using an SIP_CANCEL scheme.

11. The method of claim 3, wherein if the service mapped to the particular menu key is a Connection service and the Connection service is capable of being provided to the destination terminal, providing the Connection service comprises:
if there is a preset Connection phone number, generating a first message including a destination address of the destination terminal corresponding to the Connection phone number in order to set up a call to the destination terminal corresponding to the Connection phone number; and
transmitting the first message to the destination terminal corresponding to the Connection phone number so that a call is set up.

12. The method of claim 11, wherein the first message is generated using an SIP_INVITE scheme.

13. The method of claim 11, further comprising continuously providing the multimedia content type ring-back, if there is no Connection phone number.

14. A method for providing a multimedia content type bell by a destination terminal in a communication system, the method comprising:
providing a multimedia content type bell including menu keys mapped to services; and
upon receipt of a particular menu key while providing the multimedia content type bell providing a service mapped to the particular menu key,
wherein providing the service comprises initiating a client to perform the service in cooperation with an origination terminal, if the service is capable of being provided to the origination terminal.

15. The method of claim 14, wherein providing the service comprises initiating a client to perform the service if the service is not capable of being provided to the origination terminal.

16. The method of claim 14, wherein the possible services include at least one of a Push-To-All (PTA) service, an Instant Messaging (IM) service, a Voice Call service, a Video Call service, and a Reject service.

17. The method of claim 16, wherein if the service mapped to the particular menu key is an IM service and the IM service is capable of being provided to the origination terminal, providing the IM service comprises:
starting an IM service client;
receiving an instant message to be sent to the origination terminal;
generating a first message including the instant message and a destination address of the origination terminal; and
transmitting the first message to the origination terminal so that the instant message is displayed on the origination terminal.

18. The method of claim 17, wherein the first message is generated using a Session Initiation Protocol (SIP)_MESSAGE scheme.

19. The method of claim 16, wherein if the service mapped to the particular menu key is the PTA service and the PTA service is capable of being provided to the origination terminal, providing the PTA service comprises:
stopping providing the multimedia content type bell;
starting a PTA service client;
generating a first message including a destination address of the origination terminal for PTA call setup;
transmitting the first message to the origination terminal so that the PTA call is set up with the origination terminal; and
pushing PTA service data through a PTA call if the PTA call is set up with the origination terminal.

20. The method of claim 19, further comprising stopping a current call setup after stopping providing the multimedia content type bell.

21. The method of claim 20, wherein the first message is generated using an SIP_INVITE scheme.

22. The method of claim 16, wherein if the service mapped to the particular menu key is a Reject service and the Reject service is capable of being provided to the origination terminal, providing the Reject service comprises:
stopping providing the multimedia content type bell and stopping the current call setup;
generating a first message including a destination address of the origination terminal to reject the call setup; and
transmitting the first message to the origination terminal so that the call setup is rejected.

23. The method of claim 22, wherein the first message is generated using an SIP_480 (Temporarily Unavailable) scheme.

24. The method of claim 16, wherein if the service mapped to the particular menu key is a Voice Call service and the Voice Call service is capable of being provided to the origination terminal, providing the Voice Call service comprises:
allocating resources for a voice call;
generating a first message including a destination address of the origination terminal to request the voice call; and
transmitting the first message to the origination terminal so that the voice call is connected.

25. The method of claim 24, wherein the first message is generated using an SIP_INVITE scheme.

26. The method of claim 16, wherein if the service mapped to the particular menu key is a Video Call service and the Video Call service is capable of being provided to the origination terminal, providing the Video Call service comprises:
stopping providing the multimedia content type bell;
allocating resources for a video call;

generating a first message including a destination address of the origination terminal to request the video call; and transmitting the first message to the origination terminal so that the video call is connected.

27. The method of claim 26, wherein the first message is generated using an SIP_INVITE scheme.

28. A method for providing multimedia contents in a communication system, the method comprising:

determining by an origination terminal if a first service mapped to a particular menu key is capable of being provided to a destination terminal, upon receipt of the particular menu key while providing a multimedia content type ring-back including menu keys mapped to services preset in the origination terminal and a Personal IMS (IP Multimedia Subsystem) Portal application (PIP) server;

initiating by the origination terminal a client to perform the first service, which can be performed with the destination terminal if the first service is a service capable of being provided to the destination terminal, generating a message for providing the first service, and transmitting the message to an origination IMS server;

searching by the origination IMS server a service profile of the origination terminal and performing service triggering, upon receipt of the message, and determining a service that the origination terminal desires to perform;

transmitting by the origination IMS server the message to an application server that provides a service corresponding to the determination result;

providing by the application server the first service to the origination terminal and transmitting the message to the origination IMS server, upon receipt of the message;

transmitting by the origination IMS server the message to a destination IMS server to which the destination terminal belongs;

searching by the destination IMS server a service profile of the destination terminal and performing service triggering, upon receipt of the message, determining a service that the destination terminal desires to perform, and then transmitting the message to the destination terminal; and starting by the destination terminal a client for performing the first service to perform the first service, upon receipt of the message.

29. The method of claim 28, wherein the origination terminal initiates a client for performing the first service if the first service is not a service capable of being provided to the destination terminal.

30. The method of claim 29, wherein the possible services include at least one of a Push-To-All (PTA) service, an Instant Messaging (IM) service, a Connection service, and a Cancel service.

31. A method for providing multimedia contents in a communication system, the method comprising:

determining by a destination terminal if a first service mapped to a particular menu key is a service capable of being provided to an origination terminal, upon receipt of the particular menu key while providing a multimedia content type bell including menu keys mapped to its services preset in the destination terminal and a Personal IMS (IP Multimedia Subsystem) Portal application (PIP) server;

initiating by the destination terminal a client to perform the first service, which can be performed with the destination terminal if the first service is capable of being provided to the origination terminal, generating a message for providing the first service, and transmitting the message to a destination IMS server;

searching by the destination IMS server a service profile of the destination terminal and performing service triggering, upon receipt of the message, and determining a service that the destination terminal desires to perform;

transmitting by the destination IMS server the message to an application server that provides a service corresponding to the determination result;

providing by the application server the first service to the destination terminal upon receipt of the message, and transmitting the message to the destination IMS server;

transmitting by the destination IMS server the message to an origination IMS server to which the origination terminal belongs;

searching by the origination IMS server a service profile of the origination terminal and performing service triggering, upon receipt of the message, determining a service that the origination terminal desires to perform, and then transmitting the message to the origination terminal; and starting by the origination terminal a client for performing the first service to perform the first service, upon receipt of the message.

32. The method of claim 31, wherein the destination terminal initiates a client for performing the first service if the first service is not capable of being performed with the origination terminal.

33. The method of claim 32, wherein the possible services include at least one of a Push-To-All (PTA) service, an Instant Messaging (IM) service, a Voice Call service, a Video Call service, and a Reject service.

* * * * *